(12) United States Patent
Zhao et al.

(10) Patent No.: US 9,654,211 B2
(45) Date of Patent: May 16, 2017

(54) ESTIMATION APPARATUS AND METHOD FOR NONLINEAR DISTORTION AND RECEIVER

(71) Applicant: FUJITSU LIMITED, Kawasaki-shi, Kanagawa (JP)

(72) Inventors: Ying Zhao, Beijing (CN); Liang Dou, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 171 days.

(21) Appl. No.: 14/683,523

(22) Filed: Apr. 10, 2015

(65) Prior Publication Data

US 2015/0295643 A1 Oct. 15, 2015

(30) Foreign Application Priority Data

Apr. 11, 2014 (CN) .......................... 2014 1 0145340

(51) Int. Cl.
 *H04B 10/60* (2013.01)
 *H04B 10/079* (2013.01)
 *H04B 10/61* (2013.01)

(52) U.S. Cl.
 CPC ..... *H04B 10/0795* (2013.01); *H04B 10/6163* (2013.01)

(58) Field of Classification Search
 CPC . H04B 10/0795; H04B 10/60; H04B 10/6163
 USPC ........................................... 398/202–214, 29
 See application file for complete search history.

(56) References Cited

U.S. PATENT DOCUMENTS

| | | | | |
|---|---|---|---|---|
| 8,553,821 B1 * | 10/2013 | Eliaz | ................. | H04L 25/03178 375/148 |
| 8,861,981 B2 * | 10/2014 | Liu | .................... | H04B 10/6161 398/147 |
| 9,002,210 B2 * | 4/2015 | Lowery | .............. | H04B 10/6971 398/141 |
| 2006/0245766 A1 * | 11/2006 | Taylor | ................... | H04B 10/60 398/208 |

(Continued)

OTHER PUBLICATIONS

Tanimura et al, Analytical results on back propagation nonlinear compensator with coherent detection, Dec. 2012, OSA, pp. 28779-28785.*

(Continued)

*Primary Examiner* — Ken N Vanderpuye
*Assistant Examiner* — Dibson Sanchez
(74) *Attorney, Agent, or Firm* — Staas & Halsey LLP (57) ABSTRACT

Embodiments of the present disclosure provide an estimation apparatus and method for nonlinear distortion and a receiver. The estimation method for nonlinear distortion includes: sampling a band-limited analog signal to obtain a sampling sequence; calculating a nonlinear perturbation coefficient in nonlinear distortion estimation based on a Nyquist pulse; calculating a nonlinear perturbation term superimposed on a signal by using the nonlinear perturbation coefficient and the sampling sequence; and calculating a nonlinear distortion waveform by using the nonlinear perturbation term. With the embodiments of the present disclosure, not only any modulation formats are compatible, but also advantages of high precision and good adaptability may be achieved.

8 Claims, 5 Drawing Sheets

(56) References Cited

U.S. PATENT DOCUMENTS

| | | | | |
|---|---|---|---|---|
| 2009/0214215 | A1* | 8/2009 | Li | H04B 10/2507 398/81 |
| 2010/0014873 | A1* | 1/2010 | Bulow | H04B 10/6161 398/159 |
| 2010/0232796 | A1* | 9/2010 | Cai | H04B 10/677 398/79 |
| 2011/0135319 | A1* | 6/2011 | Youn | H04B 10/6971 398/202 |
| 2011/0255879 | A1* | 10/2011 | Xie | H04B 10/2513 398/208 |
| 2012/0027418 | A1* | 2/2012 | Secondini | H04L 25/03133 398/158 |
| 2012/0076235 | A1* | 3/2012 | Dou | H04B 10/2939 375/296 |
| 2012/0082468 | A1* | 4/2012 | Qian | H04B 10/2543 398/188 |
| 2012/0290244 | A1* | 11/2012 | Yan | H04B 10/6971 702/86 |
| 2013/0188948 | A1* | 7/2013 | Dou | H04B 10/0795 398/28 |
| 2013/0251369 | A1* | 9/2013 | Ogasahara | H04B 10/614 398/65 |
| 2014/0093255 | A1* | 4/2014 | Liu | H04B 10/6161 398/208 |
| 2014/0099128 | A1* | 4/2014 | Mateo | H04B 10/6163 398/158 |
| 2014/0286642 | A1* | 9/2014 | Lowery | H04B 10/697 398/115 |
| 2015/0071630 | A1* | 3/2015 | Oyama | H04B 10/6163 398/25 |
| 2015/0372765 | A1* | 12/2015 | Yasuda | H04B 10/613 398/29 |
| 2016/0036554 | A1* | 2/2016 | Yasuda | H04B 10/6161 398/65 |

OTHER PUBLICATIONS

Yan et al, Low Complexity Digital Perturbation Back propagation, Sep. 2011, OSA, pp. 1-3.*

Peddanarappagari, Kumar, et al.; "Volterra Series Approach for Optimizing Fiber-Optic Communications Systems Designs" IEEE, Journal of Lightwave Technology, vol. 16, No. 11, Nov. 1998.

Peddanarappagari, Kumar, et al.; "Volterra Series Transfer Function of Single-Mode Fibers", IEEE, Journal of Lightwave Technology, vol. 15, No. 12, Dec. 1997.

Fan, Yangyang, et al. "Modulation Format Dependent Phase Noise Caused by Intra-channel Nonlinearity" ECOC Technical Digest, 2012.

Tao, Zhenning, et al.; "Multiplier-Free Intrachannel Nonlinearity Compensating Algorithm Operating at Symbol Rate" IEEE, Journal of Lightwave Technology, vol. 29, No. 17, Sep. 1, 2011.

Mecozzi, Antonio, et al.; "Analysis of Intrachannel Nonlinear Effects in Highly Dispersed Optical Pulse Transmission" IEEE, Photonics Technology Letters, vol. 12, No. 4, Apr. 2000.

Kumar, Shiva, et al.; "Analytical Modeling of a Single Channel Nonlinear Fiber Optic System Based on QPSK", Optics Express, vol. 20, No. 25, Dec. 3, 2012.

Zhao, Ying, et al.; "Improved Analytical Model for Intra-Channel Nonlinear Distortion by Relaxing the Lossless Assumption", pp. 1-3, Oct. 2013.

A. Carena, et al.; "Modeling of the Impact of Nonlinear Propagation Effects in Uncompensated Optical Coherent Transmission Links", IEEE, Journal of Lightwave Technology, vol. 30, No. 10, May 15, 2012.

Vannucci, Armando, et al.; "The RP Method: A New Tool for the Iterative Solution of the Nonlinear Schrödinger Equation", IEEE, Journal of Lightwave Technology, vol. 20, No. 7, Jul. 2002.

* cited by examiner

ESTIMATION APPARATUS AND METHOD FOR NONLINEAR DISTORTION AND RECEIVER

CROSS REFERENCE TO RELATED APPLICATIONS

This application claims the benefit of Chinese Application No. 201410145340.3, filed Apr. 11, 2014, the disclosures of which is incorporated herein by reference.

TECHNICAL FIELD

The present disclosure relates to a long-haul optical fiber communication system, and, in particular, to an estimation apparatus and method for nonlinear distortion and a receiver.

BACKGROUND

Based on assumptions of slowly varying envelope approximation and constant polarization state, an intra-optical fiber pulse evolved transmission equation may be described by a nonlinear Schrodinger equation (such as being described by a Manakov equation under random polarization). Such a transmission equation is used to describe waveform evolvement of an optical pulse signal under a combined effect of dispersion and Kerr effect. However, as the nonlinear Schrodinger equation has no analytic solution in taking a combined effect of nonlinearity and dispersion effect, quantitative research on nonlinear damage of an optical fiber and a related theoretical model are being developed and established for approximation solutions of the nonlinear Schrodinger equation.

As it is hopeful that the approximation solutions may reduce calculation complexity of nonlinear analysis, it draws wide attention of the academe and has quickly developed in recent years. As an adaptable method for solving the nonlinear Schrodinger equation, the Volterra series expansion method makes an analysis framework of a conventional communication system to be lent to an optical fiber communication system, and is better for different pulse shapes and link types.

Paolo Serena obtained a regular perturbation (RP) method based on development of the Volterra series expansion method, and granted relatively definite physical meanings to the orders or perturbation, thereby making the method for solving the nonlinear Schrodinger equation developed rapidly, and various theoretical frameworks being derived for quantifying nonlinear distortion in the time domain or the frequency domain. A generalized result shows that for a typical long-haul optical fiber transmission system, a nonlinear action is fully described by Volterra series under three orders (one order of perturbation), therefore, the currently popular nonlinear analysis accepts an analysis framework of the Volterra series expansion of a lower order, i.e. quasi-linear approximation. In the quasi-linear approximation, a one-order perturbation framework for solving a nonlinear transmission equation may be summarized as solving a vector sum of a pulse after dispersion (linear) action subjected to nonlinear distortion at every points in a propagation path, which is analytically expressed as that a product of time domain three items for transmission of the pulse is a triple integral of the integrand.

Theoretic analysis shows that an analytic expression of one-order perturbation may be simplified under certain conditions, such that calculation complexity of a perturbation method may be reduced. Currently, a most typical and successful theoretical approximation is an analytic solution of a lossless large dispersion link, and in such a method, it is assumed that the optical fiber transmission link is lossless and the accumulated dispersion is sufficiently large, and a carrier pulse for transmitting a digital sequence is ensured to be in a Gaussian shape. In the above approximation, the triple integral of the one-order perturbation may be strictly integrable, which may be expressed as a closed-form solution of a special function. Although such a method may reduce the calculation complexity to a large extent, as key Gaussian pulse approximation exists, precision of calculation in a non-Gaussian pulse transmission system that is relatively widely used is limited, thereby limiting a range of application of this method.

As the mature of high-speed digital signal process (DSP) and narrowband optical filtering technologies, attention is paid more and more to optical orthogonal frequency division multiplexing (OOFDM) technology with a high spectral utilization and Nyquist wave division multiplexing (Nyquist WDM) technology. In a transmission system with a high spectral utilization, as a spectral density of signals is further enlarged, nonlinear damages are intensified, thereby resulting in comparable negative effect on power budget and transmission distance of the system. In such a scenario, in order to achieve more accurate coherent transmission system performance estimation and find out more optimal system design rules, study on accurate nonlinear theoretical models are outstandingly meaningful.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

Documents advantageous to the understanding of the present disclosure and the prior art are listed below, which are incorporated herein by reference, as they are fully described herein.

Non-patent document 1: K. V. Peddanarappagari et. al., IEEE JLT Vol. 15, pp. 2232-2241, 1997;

Non-patent document 2: IEEE JLT Vol. 16, pp. 2046-1055, 1998;

Non-patent document 3: A. Vannucci et. al., IEEE JLT Vol. 20, No. 7, pp. 1102-1111, 2002;

Non-patent document 4: Z. Tao et al., IEEE JLT Vol. 29, pp. 2570-2576, 2011;

Non-patent document 5: A. Carena et. al., IEEE JLT Vol. 30, No. 10, pp. 1524-1539, 2012;

Non-patent document 6: A. Mecozzi et. al., IEEE PTL Vol. 12, No. 4, pp. 392-394, 2000;

Non-patent document 7: S. Kumar et. al., Optics Express, Vol. 20, No. 25, pp. 27740-27754, 2012;

Non-patent document 8: Y. Zhao et al., ECOC2013, P.4.15; and

Non-patent document 9: Y. Fan et al., ECOC2012, We.2.C.3.

SUMMARY

Currently, the demand for nonlinear theoretical models is not limited to a Gaussian pulse shape only, but is expanded to a Nyquist pulse shape or even any waveform directions. Based on the Nyquist sampling theorem, any band-limited signal may be expressed by a Nyquist sampling pulse, hence, a nonlinear estimation method applicable to the Nyquist pulse shape is an important basis for expanding the study of a nonlinear model with adaptability. And on the other hand, from the perspective of nonlinear compensation and improvement of system performance, a nonlinear estimation model with higher precision is a basis for a nonlinear compensation method at the same time, thereby being advantageous to reducing nonlinear damages, improving system performance or reducing complexity of a nonlinear compensation system.

Embodiments of the present disclosure provide an estimation apparatus and method for nonlinear distortion and a receiver, in which not only any modulation formats are compatible, but also advantages of high precision and good adaptability may be achieved.

According to an aspect of the embodiments of the present disclosure, there is provided an estimation apparatus for nonlinear distortion, including:

a signal sampling unit, configured to sample a band-limited analog signal to obtain a sampling sequence;

a coefficient calculating unit, configured to calculate a nonlinear perturbation coefficient in nonlinear distortion estimation based on a Nyquist pulse;

a perturbation term calculating unit, configured to calculate a nonlinear perturbation term superimposed on a signal by using the nonlinear perturbation coefficient and the sampling sequence; and a waveform estimating unit, configured to calculate a nonlinear distortion waveform by using the nonlinear perturbation term.

According to another aspect of the embodiments of the present disclosure, there is provided an estimation method for nonlinear distortion, including:

sampling a band-limited analog signal to obtain a sampling sequence;

calculating a nonlinear perturbation coefficient in nonlinear distortion estimation based on a Nyquist pulse;

calculating a nonlinear perturbation term superimposed on a signal by using the nonlinear perturbation coefficient and the sampling sequence; and calculating a nonlinear distortion waveform by using the nonlinear perturbation term.

According to a further aspect of the embodiments of the present disclosure, there is provided a receiver, including the estimation apparatus for nonlinear distortion as described above.

An advantage of the embodiments of the present disclosure exists in that a band-limited signal is sampled, and a nonlinear distortion waveform is estimated by calculating a nonlinear perturbation coefficient based on a Nyquist pulse, hence, not only any modulation formats are compatible, but also advantages of high precision and good adaptability may be achieved.

With reference to the following description and drawings, the particular embodiments of the present disclosure are disclosed in detail, and the principles of the present disclosure and the manners of use are indicated. It should be understood that the scope of the embodiments of the present disclosure is not limited thereto. The embodiments of the present disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of the present disclosure only, and a person of ordinary skill in the art may obtain other drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Figure 1:
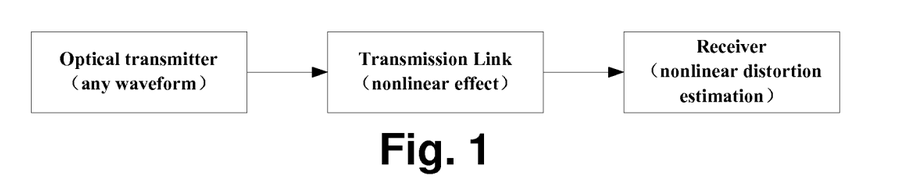
FIG. 1 is a schematic diagram of the structure of a long-haul optical fiber transmission system.

The embodiments of the present disclosure are applicable to a long-haul optical fiber communication system, and quantitative estimation is performed to nonlinear distortion of data signals in a transmission process. FIG. 1 is a schematic diagram of the structure of a long-haul optical fiber transmission system. As shown in FIG. 1, a signal transmitted by a transmitter reaches a receiver after passing through different devices in a transmission link (such as an optical fiber, an optical amplifier, and a dispersion compensation optical fiber, etc.). In the system shown in FIG. 1, nonlinear distortion estimation needs to be performed at the receiver end.

Under a one-order perturbation framework, the embodiments of the present disclosure provide an estimation method and apparatus for nonlinear distortion applicable to any band-limited waveform. The method has an advantage of high precision and good adaptability, is applicable to a non-dispersion compensation link (NDM) and a dispersion management link (DM), in which any modulation formats are compatible; and it is also applicable to a single polarization or polarization multiplexing system. The estimation method is based on calculation of a nonlinear perturbation coefficient (which may also be referred to as a weighting coefficient) of a Nyquist pulse, and gives a method of calculation of nonlinear perturbation of a sampling sequence, thereby forming a set of nonlinear distortion estimation models of any waveform based on sampling, coefficient calculation, perturbation and nonlinear distortion calculation.

Embodiment 1

Figure 2:
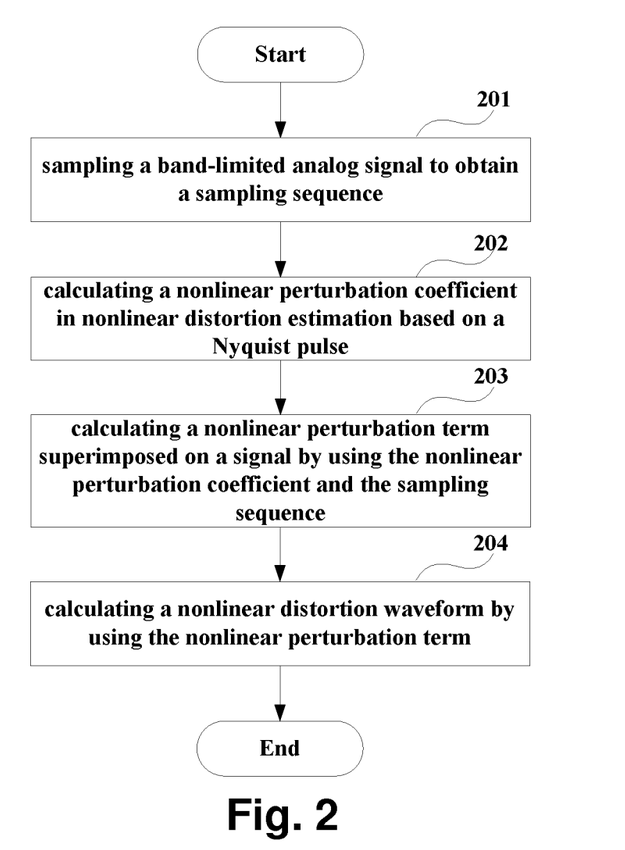
FIG. 2 is a flowchart of the estimation method of Embodiment 1 of the present disclosure.

An embodiment of the present disclosure provides an estimation method for nonlinear distortion. FIG. 2 is a flowchart of the estimation method of the embodiment of the present disclosure. As shown in FIG. 2, the estimation method includes:

step 201: sampling a band-limited analog signal to obtain a sampling sequence;

step 202: calculating a nonlinear perturbation coefficient in nonlinear distortion estimation based on a Nyquist pulse;

step 203: calculating a nonlinear perturbation term superimposed on a signal by using the nonlinear perturbation coefficient and the sampling sequence; and step 204: calculating a nonlinear distortion waveform by using the nonlinear perturbation term.

In this embodiment, a nonlinear estimation model of any band-limited signal takes a sampling value of a signal waveform and link coefficients as input, and a nonlinear distortion waveform as output. It should be noted that the order of executing the steps in FIG. 2 is not limited thereto; for example, the order of executing steps 201 and 202 may be adjusted, or steps 201 and 202 may be executed at the same time, etc., according to an actual situation.

Figure 3:
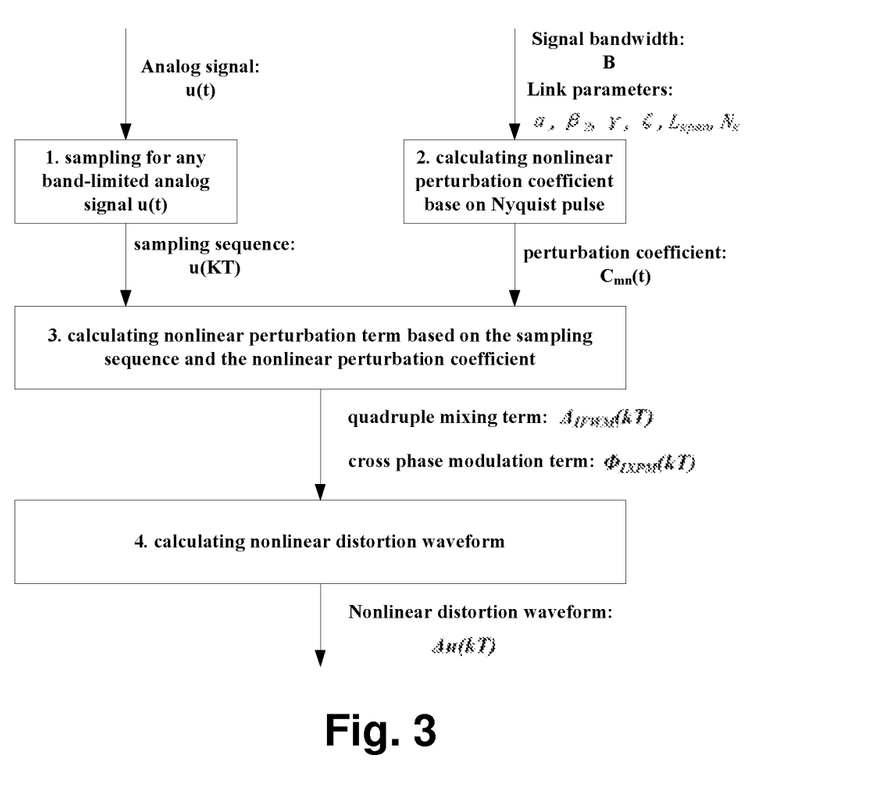
FIG. 3 is a schematic diagram of the structure of the nonlinear estimation model of any waveform of Embodiment 1 of the present disclosure.

FIG. 3 is a schematic diagram of the structure of the nonlinear estimation model of any waveform of the embodiment of the present disclosure. As shown in FIG. 3, the embodiment of the present disclosure is carried out by four functions; those are completed respectively: sampling of an analog signal, calculation of a nonlinear perturbation coefficient, calculation of a nonlinear perturbation term, and calculation of distorted waveform, which shall be described below in detail with reference to FIGS. 2 and 3.

In step 201, any band-limited analog signal may be sampled. It is pointed out in the Nyquist sampling theorem that a band-limited analog signal u(t) (for example, spectrum occupies −B~+B) may be uniquely expressed by a sampling value of a sampling interval not greater than ½B. On the premise that the sampling theorem is satisfied, u(t) may be expressed as infinite series of an orthogonal sampling function (a sin c function), as shown in equation (1); where, T is a sampling period. Roots of the infinite series are sin c functions (Nyquist pulses) orthogonal to each other, and the coefficient is a sapling value u(kT) of u(t). Equation (1) shows that the band-limited signal may be recovered without distortion from its sampling value sequence by a matrix filter.

$$u(t) = \Sigma_{k=-\infty}^{+\infty} 2B \cdot u(kTs) \cdot \text{sinc} [2\pi B(t-kTs)] \quad (1)$$

On the premise that the sampling theorem is not satisfied, i.e. a sampling frequency $f_s < 2B$, u(t) cannot be expressed by a sampling sequence without distortion. At this moment, expressing an analog signal by using a sampling sequence will introduce inevitable frequency domain aliasing distortion, the size of the distortion being related to a signal frequency and a sampling rate.

In summary, no matter whether the aliasing is introduced, the band-limited analog signal may be expressed by a Nyquist pulse sequence. Considering from a perspective of applicability of a nonlinear model, if a theoretical model is capable of efficiently describing a nonlinear evolvement feature of the Nyquist pulse sequence, it may be applied to analysis of nonlinear distortion of any waveform based on the sampling theorem. A sampling rate of a pulse sequence is not limited in the embodiment of the present disclosure, and the theoretical analysis is applicable to cases with aliasing distortion or without aliasing distortion.

In step 202, the nonlinear perturbation coefficient in the nonlinear distortion estimation may be calculated based on the Nyquist pulse; wherein, an optical fiber in the whole transmission link may be divided into multiple optical fiber spans, and for each optical fiber span, following processing may be performed: performing integral processing on a nonlinear perturbation coefficient of each optical fiber span based on link parameters; performing large dispersion approximation on the integral processed nonlinear perturbation coefficient; simplifying the large dispersion approximated nonlinear perturbation coefficient by using the Nyquist pulse, so as to obtain a nonlinear perturbation coefficient of each optical fiber span in a form of a single integral.

In this embodiment, the respectively obtained nonlinear perturbation coefficients of different optical fiber spans may be summed up, so as to obtain a nonlinear perturbation coefficient of the whole transmission link in a form of a single integral.

Furthermore, approximation processing may be performed on link loss or a gain function in intra-channel nonlinear distortion estimation by using a rational function, and the nonlinear perturbation coefficient in a form of a single integral is calculated by using the approximated link loss or gain function, so as to obtain a nonlinear perturbation coefficient of each optical fiber span in an analytic form; and the respectively obtained nonlinear perturbation coefficients of different optical fiber spans are summed up, so as to obtain a nonlinear perturbation coefficient of a whole transmission link in an analytic form.

Furthermore, the nonlinear perturbation coefficient in a form of a single integral may be calculated after ignoring the link loss or gain function, so as to obtain a nonlinear perturbation coefficient of each optical fiber span in an analytic form; and the respectively obtained nonlinear perturbation coefficients of different optical fiber spans are summed up, so as to obtain a nonlinear perturbation coefficient of a whole transmission link in an analytic form.

Figure 4:
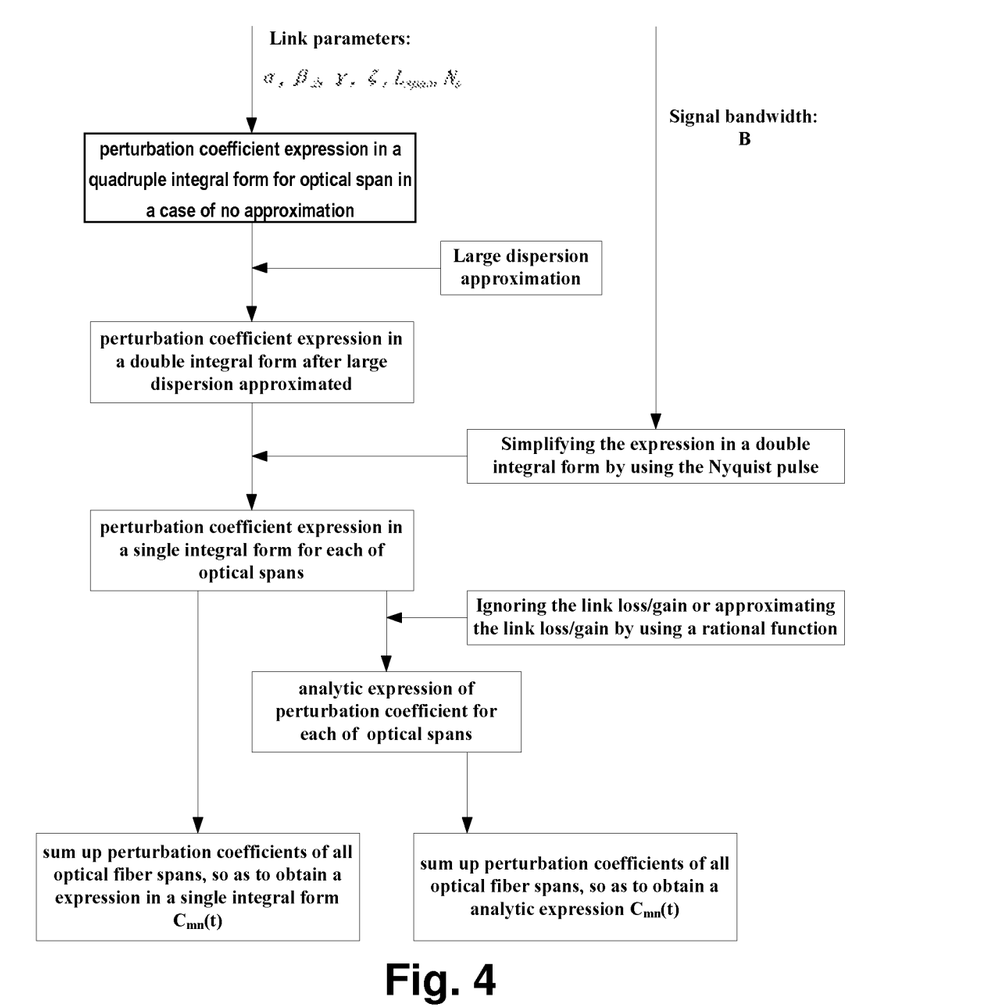
FIG. 4 is a schematic diagram of calculating a nonlinear perturbation coefficient of a Nyquist pulse shape of Embodiment 1 of the present disclosure.

FIG. 4 is a schematic diagram of calculating a nonlinear perturbation coefficient of a Nyquist pulse shape of the embodiment of the present disclosure. Calculation of the nonlinear perturbation coefficient of the embodiment of the present disclosure shall be described below in detail with reference to FIG. 4.

In a case where a transmission sequence pulse shape and link parameters are know and no approximation is taken into account, for an i-th optical fiber span, a one-order nonlinear perturbation weighting coefficient may be expressed as $$C_{m,n}^i(t) = \quad (2)$$

$$F^{-1}[\tilde{C}_{m,n}^j(f)] = j\frac{8}{9}F^{-1}\left\{\int_0^{L_s} e^{-\alpha z_i - jC(z_i)(2\pi f)^2/2} F[g(t-mT, z_i) \cdot$$

$$g(t-nT, z_i) \cdot g^*(t-(m+n)T, z_i)]dz_i\right\} =$$

$$j\frac{8}{9}F^{-1}\left\{\int_0^{L_s} e^{-\alpha z_i - jC(z_i)(2\pi f)^2/2}[\tilde{g}(f, z_i)e^{j2\pi fmT}] * [\tilde{g}(f, z_i)e^{j2\pi fnT} * [\tilde{g}(-f, z_i)e^{j2\pi f(m+n)T}]dz_i\right\}$$

Where, α, γ are an attenuation coefficient and a nonlinear coefficient of an optical fiber, m, n denote that three pulse positions of a nonlinear action are t=mT, nT, (m+n)T, g(t, z) and g̃(f, $z_i$) are a time domain expression and a frequency domain expression of a symbol pulse when it is transmitted to $z_i$ respectively, $z_i$ denoting a transmission distance of the signal at the i-th span, $L_s$ is a length of the optical fiber span, $β_2$ is a dispersion coefficient, ζ is a residual dispersion rate, $C(z_i)=β_2(i-1)ζ L_s+β_2 z_i$ is accumulated dispersion of the i-th span, F(·) is Fourier transform, $F^{-1}(·)$ is inverse Fourier transform, and "*" denotes a convolution operation.

It can be seen from Equation (2) that in a case of no approximation, the nonlinear perturbation coefficient $C_{m,n}^i(t)$ may be uniformly expressed in a quadruple integral form (where, $F^{-1}(·)$ is a single integer, and the frequency domain two-dimensional convolution is a double integer), thereby performing calculation by using a numerical value method.

As the calculation of the perturbation coefficient is the core of the estimation of the nonlinear distortion, the current study uniformly tends to how to simplify the quadruple integral shown in Equation (2), so that achieve nonlinear estimation of high precision by hardware of low complexity. A process of approximating Equation (2) into a single integral or an analytic solution in a specific case shall be described below.

Large dispersion approximation is introduced first, and evolution of a symbol pulse under only an action of dispersion can be described approximately by using a far field.

$$g(t, z) = \int_{-\infty}^{+\infty} e^{j[2\pi ft + 2\pi^2 C(z_i)f^2]}\tilde{g}(f, 0)df \quad (3)$$

$$\approx \sqrt{\frac{1}{j2\pi C(z_i)}} \cdot \tilde{g}\left(-\frac{t}{C(z_i)}, 0\right)e^{-j\frac{t^2}{2C(z_i)}}$$

The far field approximation may be physically interpreted as that in a case where dispersion is sufficiently large, a shape of a pulse is evolved into a Fourier transform of a transmission pulse, and long-haul transmission maps a pulse frequency domain shape to a time domain, with its principle being similar to the Fraunhofer far field diffractive integral, hence, it is referred to as far field approximation.

The quadruple integral may be simplified into an expression of double integral by bringing Equation (3) into Equation (2):

$$C_{m,n}^i(t) = \quad (4)$$

$$j\frac{8}{9} \cdot \int_{-\infty}^{+\infty} e^{j2\pi ft} df \int_0^{L_s} \frac{e^{-\alpha z_i}}{2\pi C(z_i)} \tilde{g}\left(f - \frac{mT}{2\pi C(z_i)}, 0\right)\tilde{g}\left(f - \frac{nT}{2\pi C(z_i)}, 0\right)$$

$$\tilde{g}\left(-f + \frac{(m+n)T}{2\pi C(z_i)}, 0\right)e^{j\frac{mnT^2}{C(z_i)}} dz_i$$

Equation (4) shows that the two-dimensional convolution in large dispersion approximation may be approximated by multiplication.

In taking a Nyquist shaping pulse (a roll-off coefficient is 0) of sampling points into account, Equation (4) may further be simplified. Taking the spectrum of the Nyquist pulse into account, $$\tilde{g}(f, 0) = \begin{cases} 1/f_s, & -f_s/2 \le f \le f_s/2 \\ 0, & \text{others} \end{cases} \quad (5)$$

where, $f_s=1/T$ is a sampling rate. Bringing Equation (5) into Equation (4), an integral factor becomes into:

$$\tilde{X}_{m,n}(f, z_i) = \frac{e^{-\alpha z_i}}{2\pi C(z_i)} \tilde{g}'_{m,n}(f)e^{j\frac{mnT^2}{C(z_i)}} \quad (6)$$

where, overlapped spectrum $\tilde{g}'_{m,n}(f)$ is denoted as:

$$\tilde{g}'_{m,n}(f) = \begin{cases} 1/f_s^3, & l_{m,n} \le f \le r_{m,n} \\ 0, & \text{others} \end{cases} \quad (7)$$

$l_{m,n}$ and $r_{m,n}$ decide upper and lower limits of the overlapped spectrum, $l_{m,n}$=max(m, n, m+nT2πCzi−fs2

$$r_{m,n} = \min(m, n, m+n)\frac{T}{2\pi C(z_i)} + \frac{f_s}{2} \quad (8)$$

As $l_{m,n} \le r_{m,n}$ needs to be ensured, for determined m and n, the integral range is further constrained as:

$$z_i \ge \quad (9)$$

$$z_i^0(m, n) = [\max(m, n, m+n) - \min(m, n, m+n)]\frac{T^2}{2\pi β_2} - (i-1)ζL_s$$

Bringing Equation (6) into Equation (4) and performing inverse Fourier transform on rectangular overlapped pulses, a time domain nonlinear perturbation coefficient of the i-th span may be expressed as:

$$C_{m,n}^i(t) = j\frac{8}{9}\int_{z_i^0}^{L_s} \frac{e^{-\alpha z_i}}{2\pi C(z_i)f_s^3} e^{j\frac{mnT^2}{C(z_i)}} (r_{m,n} - l_{m,n})$$

$$e^{-j\pi(r_{m,n}+l_{m,n})t}\text{sinc}[\pi(r_{m,n} - l_{m,n})t]dz_i \quad (10)$$

Equation (10) denotes that the nonlinear perturbation coefficient of the Nyquist shaping pulse may represent a one-dimensional integral form for the transmission distance. Such a one-dimensional integral may be calculated by using a numerical value method, and for the quadruple integral shown in Equation (2), the calculation complex may be outstandingly lowered. In the numerical value calculation, a perturbation coefficient of the whole transmission link may perform direct summation on the optical fiber spans, so as to obtain an expression of a perturbation coefficient in a one-dimensional form.

$$C_{m,n}(t) = \sum_i C^i_{m,n}(t) = \quad (11)$$

$$j\frac{8}{9}\sum_i \int_{z_i^0}^{L_s} \frac{e^{-\alpha z_i}}{2\pi C(z_i)f_s^3} e^{j\frac{mnT^2}{C(z_i)}}(r_{m,n}-l_{m,n})e^{-j\pi(r_{m,n}+l_{m,n})t}$$

$$\mathrm{sinc}[\pi(r_{m,n}-l_{m,n})t]dz_i$$

For Equation (11), a reason that there exists no analytic form in the one-dimensional integral is that there exists an exponential attenuation factor in an integral factor.

For further obtaining an analytic solution of the perturbation coefficient, it may be taken into account to ignore the exponential attenuation, which is similar to a method for processing an attenuation factor by a Mecozzi model in a Gaussian pulse shape; wherein, let $\int_0^{L_s} e^{-\alpha\alpha z_i}$. f(zi) dzi $\approx 1\alpha\cdot 0$Lsf(zi)dzi, and an analytic expression of Equation (12) may be obtained in such approximation:

$$C^i_{m,n}(t) = \quad (12)$$

$$\begin{cases} \frac{8}{9}\frac{L_{eff}}{L_s}\frac{1}{4\pi^2|\beta_2|tf_s^3}\left[e^{-j\frac{\pi t}{T}}E_i\left(-j\frac{T[mnT-\min\cdot t]}{C(z_i)}\right)-\right]\Big|_{z_i^0}^{L_s}, (t\ne 0) \\ \qquad\qquad\qquad\qquad\left[e^{j\frac{\pi t}{T}}E_i\left(-j\frac{T[mnT-\max\cdot t]}{C(z_i)}\right)\right] \\ j\frac{8}{9}\frac{L_{eff}}{L_s}\left[\frac{1}{2\pi|\beta_2|f_s^2}E_i\left(-j\frac{T^2mn}{C(z_i)}\right)+j\frac{\min-\max}{4\pi^2|\beta_2|f_s^4mn}e^{j\frac{mnT^2}{C(z_i)}}\right]\Big|_{z_i^0}^{L_s}, (t=0) \end{cases}$$

where, $L_{eff}=1/\alpha$ is defined as an effective transmission distance, min, max denote min(m, n, m+n) and max(m, n, m+n), respectively. An analytic expression of a total perturbation coefficient may be obtained by performing summation on exponents of the spans in Equation (12).

Another manner for processing attenuation factor is: replacing the exponential attenuation function with a specific rational function, so as to achieve a goal of making Equation (11) integrable. Such a processing method is better in estimation precision over the method of ignoring the attenuation, and is one of effective means for processing exponential attenuation.

The calculation method of a perturbation coefficient of the Nyquist shaping pulse is given above, which is applicable to describing an evolvement process of nonlinear distortion of any waveform transmitted in any modulation format in the optical fiber link, does not limit the transmission link, and is a universal estimation method for nonlinear distortion.

In step 203, the nonlinear perturbation coefficient and the sampling sequence may be used to calculate a nonlinear perturbation term superimposed on a signal. Wherein, an effect of nonlinear inter-symbol crosstalk is added in calculating the nonlinear perturbation term.

In this embodiment, a physical meaning of $C_{m,n}(t)$ is time domain waveforms of shadow pulses produced at t=0 by Nyquist pulses located at three positions of t=mT, nT, (m+n)T, and a nonlinear distortion waveform of the whole pulse sequence is superimposition of shadow pulses at every time. Therefore, a characteristic of a shadow pulse decides a characteristic of nonlinear distortion to a certain extent. And it is necessary to further discuss a shadow pulse and a method for calculating a nonlinear distortion term.

A nonlinear perturbation term is conventionally expressed in a form of a weighted sum of a product of three items of a pulse sequence, which is expressed as follows in a polarization multiplexing system:

$$u^{H/V}(kT)=\Sigma_{m,n}[A_{m+k}^{H/V}A_{n+k}^{H/V}(A_{m+n+k}^{H/V})^*+ \\ A_{m+k}^{H/V}A_{n+k}^{V/H}(A_{m+n+k}^{V/H})^*]C_{m,n}(0) \quad (13);$$

where, $\Delta u^{H/V}(kT)$ denotes nonlinear distortion at the H or V polarization state at a time of kT, and $A_m^{H/V}$ denotes digital information of a transmission sequence at the H or V polarization state at a time of mT. This expression only uses information on the nonlinear perturbation coefficient at a time of t=0, with an implied assumption that a width of the nonlinear shadow pulse is sufficiently narrow, so that an effect of the shadow pulse on other sampling points may be ignored. However, such an assumption is applicable a Gaussian pulse sequence only, and for any waveform, an ideal sampling pulse is a Nyquist pulse, of which a characteristic of the nonlinear shadow pulse being different from a characteristic of a Gaussian shadow pulse, which is represented as that an expression of the nonlinear perturbation coefficient is different.

Figure 5:
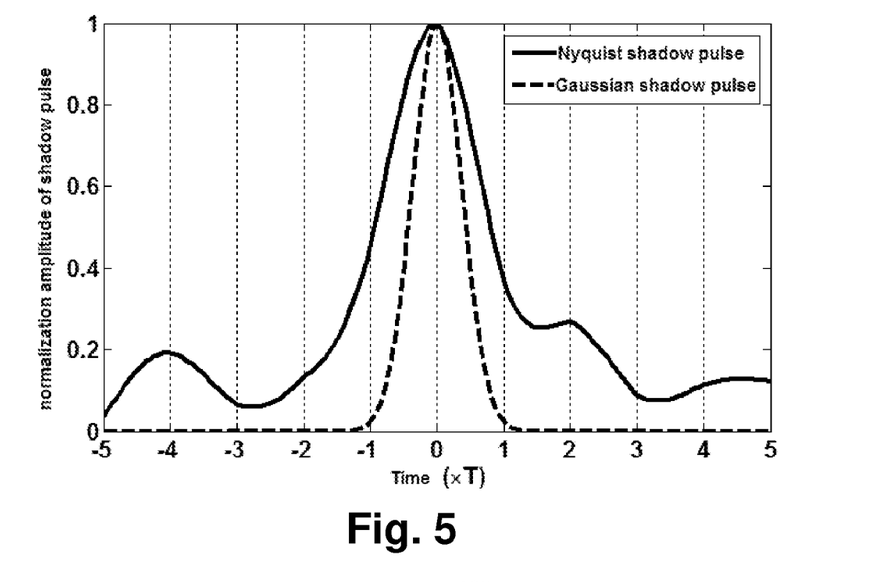
FIG. 5 is a schematic diagram of comparison of a Nyquist shadow pulse and a Gaussian shadow pulse of Embodiment 1 of the present disclosure.

FIG. 5 is a schematic diagram of comparison of a Nyquist shadow pulse and a Gaussian shadow pulse of the embodiment of the present disclosure. Without loss of generality, FIG. 5 shows shapes of shadow pulses produced at t=0 by two pairs of Gaussian pulses or Nyquist pulses with m=20T and n=40T. Simulation conditions are that a pulse period T=31.25 ps, pulse average power is −3 dBm, and the transmission link is a 100 km single-mode optical fiber with 500×17 ps/nm dispersion.

As shown in FIG. 5, the width of the Nyquist shadow pulse is obvious greater than that of the Gaussian shadow pulse, and at a time of t=±T, the effect of the Gaussian shadow pulse may be ignored, but the effect of the Nyquist shadow pulse is remarkable. Therefore, the Nyquist pulse at t=(m+k)T, t=(n+k)T and t=(m+n+k)T not only produces nonlinear perturbation at t=kT, but also produces perturbation at t=(k±1)T, (k±2)T, . . . .

In summary, it can be called that contribution of the Nyquist pulse at t≠kT located at t=(m+k)T, (n+k)T, (m+n+k)T is nonlinear symbol crosstalk (NL-ISI). Taking nonlinear distortion of any waveform constituted by the Nyquist sampling pulse into account, the embodiment of the present disclosure proposes that a nonlinear symbol crosstalk term should be taken into account in calculating the nonlinear perturbation term. In this case, the expression of the nonlinear perturbation term is changed into:

$$\Delta u^{H/V}(kT)=\Sigma_{l,m,n}[A_{m+k+l}^{H/V}A_{n+k+l}^{H/V}(A_{m+n+k+l}^{H/V})^*+ \\ A_{m+k+l}^{H/V}A_{n+k+l}^{V/H}(A_{m+n+k+l}^{V/H})^*]C_{m,n}(lT) \quad (14)$$

that is, in the dual-polarization state, $$\Delta u^H(KT) = \\ \sum_{l,m,n}[A_{m+k+l}^H A_{n+k+l}^H(A_{m+n+k+l}^H)^* + A_{m+k+l}^H A_{n+k+l}^V(A_{m+n+k+l}^V)^*]C_{m,n}(lT),$$

$$\Delta u^V(KT) = \\ \sum_{l,m,n}[A_{m+k+l}^V A_{n+k+l}^V(A_{m+n+k+l}^V)^* + A_{m+k+l}^V A_{n+k+l}^H(A_{m+n+k+l}^H)^*]C_{m,n}(lT);$$

where, l is an integer, T is a symbol period, $A_{m+k+l}^H$ and $A_{m+k+l}^V$ denote symbol information of a pulse at the horizontal polarization state and the vertical polarization state at a time of m+k+l, respectively, $A_{n+k+l}^H$ and $A_{n+k+l}^V$ denote symbol information of the pulse at the horizontal polarization state and the vertical polarization state at a time of n+k+l, respectively, and $(A_{m+n+k+l}^H)^*$ and $(A_{m+n+k+l}^V)^*$ denote conjugates of the symbol information of the pulse at the horizontal polarization state and the vertical polarization state at a time of m+n+k+l;

or, in a single-polarization state, the expression of the nonlinear perturbation term is:

$$\Delta u(KT) = \sum_{l,m,n} [A_{m+k+l} A_{n+k+l} (A_{m+n+k+l})^*] C_{m,n}(lT);$$

where, l is an integer, T is a symbol period, $A_{m+k+l}$ denotes symbol information of a pulse at the single-polarization state at a time of m+k+l, $A_{n+k+l}$ denotes symbol information of the pulse at the single-polarization state at a time of n+k+l, and $(A_{m+n+k+l})^*$ denotes conjugates of the symbol information of the pulse at the single-polarization state at a time of m+n+k+l.

In this embodiment, an analytic expression of a perturbation coefficient taking nonlinear symbol crosstalk into account may be obtained by using Equation (12) to perform direction summation on the optical fiber spans:

$$C_{m,n}(lT) = \sum_i C_{m,n}^i(lT) = \frac{8}{9} \frac{L_{\mathit{eff}}}{L_s} \quad (14a)$$

$$\begin{cases} \frac{1}{4\pi^2 |\beta_2| lTf_s^3} \sum_i \left[ e^{-\frac{j\pi t}{T}} E_i\left(-j\frac{T[mnT - \min \cdot lT]}{C(z_i)}\right) - \right. \\ \left. e^{\frac{j\pi t}{T}} E_i\left(-j\frac{T[mnT - \max \cdot lT]}{C(z_i)}\right) \right]\Big|_{z_i^0}^{L_s}, \quad (l \neq 0) \\ j \sum_i \left[ \frac{1}{2\pi |\beta_2| f_s^2} E_i\left(-j\frac{T^2 mn}{C(z_i)}\right) + j\frac{\min - \max}{4\pi^2 |\beta_2| f_s^4 mn} e^{j\frac{mnT^2}{C(z_i)}} \right]\Big|_{z_i^0}^{L_s}, \quad (l = 0) \end{cases}$$

In Equation (14), the information on the nonlinear perturbation coefficient at other sampling points than 0 is used to calculate a nonlinear perturbation term, and adaptability is better and accuracy of the result is higher in using this equation for calculating the nonlinear perturbation. In using Equation (14) for calculating the nonlinear perturbation, as a range of values of I is limited, a truncation operation needs to be performed on I, and as shown in FIG. 5, the nonlinear inter-symbol crosstalk is relatively remarkable at ±T and ±2T to which the shadow pulses are close, and its effect is relatively small at other locations. Therefore, a range of truncation of I is usually taken as −3≤I≤3.

Calculation of the nonlinear distortion waveform in step 204 shall be described below. Actually, in the one-order nonlinear perturbation theorem, the nonlinear perturbation term shown in Equation (14) is completely deemed as additive perturbation, hence, superimposing the nonlinear perturbation term directly on the basis of the analytic solution may be deemed as a method for calculating a distortion waveform, that is, $$u^{H/V}(kT) = u_0^{H/V}(kT) + \Delta u^{H/V}(kT) \quad (15)$$

where, $u_0^{H/V}(kT)$ is a linear solution of the nonlinear Schrodinger equation.

Equation (15) is an expression of conventional calculation of nonlinear distortion waveform. Although Equation (15) is a theoretical solution of a one-order perturbation method, uniformly deeming nonlinear perturbation terms as additive terms is irrational, and such irrationality is actually originated from theoretical deviation of quasi-linear approximation of the one-order perturbation method when a nonlinear action is relatively intense.

Further studies show that properly introducing high-order nonlinear terms may improve the precision of the estimation method and increase power adaptability range of the estimation method. A relatively typical result of this aspect is the previously-proposed nonlinear additive multiplicative (AM) model. In the additive multiplicative model, starting from the result produced by nonlinear pulse interaction, a difference between nonlinear perturbation terms related to three types of pulse interaction and two types of pulse interaction is discussed, pointing out that the nonlinear perturbation terms related to two types of pulse interaction are actually represented as nonlinear phase noises, thereby obtaining a method for calculating a nonlinear distortion waveform of higher application value, which is expressed as follows taking $u^H(kT)$ as an example:

$$\Delta u^H(kT) = [u_0^H(kT) + \Delta_{IFWM}(kT)] \exp[j\phi_{IXPM}(kT)] \quad (16)$$

where, $$\Delta_{IFWM}(kT) = \quad (16a)$$
$$\sum_{m \neq 0, n \neq 0} [A_{m+k}^H A_{n+k}^H (A_{m+n+k}^H)^* + A_{m+k}^H A_{m+k}^V (A_{m+n+k}^V)^*] C_{m,n}(0) +$$
$$\sum_{m \neq 0, n} A_{m+k}^H A_{n+k}^V (A_{m+n+k}^V)^* C_{m,n}(0)$$

$$\phi_{IXPM}(kT) = \quad (16b)$$
$$\sum_{m \neq 0} (2|A_{m+k}^H|^2 + |A_{m+k}^V|^2) C_{m,0}(0) + (|A_k^H|^2 + |A_k^V|^2) C_{0,0}(0)$$

$\Delta_{IFWM}(kT)$ is an intra-channel quadruple mixing term, and $\phi_{IXPM}(kT)$ is an intra-channel cross phase modulation term, corresponding respectively to nonlinear distortion introduced by three pieces of pulse interaction and two pieces of pulse interaction; wherein, the distortion of the three pieces of pulse interaction is still deemed as an additive term, and the distortion of the two pieces of pulse interaction is deemed as phase distortion, represented as a form of a product of the distortion and a nonlinear term. Equation (16) exhibits good precision of calculation in calculating a nonlinear distortion waveform of a Gaussian pulse.

In a case of Nyquist pulse shape, as nonlinear intra-symbol crosstalk needs to be taken into account, the number of terms of nonlinear triple term product related to equations (16a) and (16b) is increased. Under a condition of accepting the physical meaning described by the additive multiplicative model, the expression of the additive multiplicative model under the Nyquist pulse needs to be modified, with a theoretical basis for the modification being that the terms of triple term product without participation of a local symbol are concluded as a $\Delta_{IFWM}(kT)$ term, and the terms of triple term product with participation of the local symbol are concluded as a $\phi_{IXPM}(kT)$ term.

Based on the above rule, the expressions of $\Delta_{IFWM}(kT)$ and $\phi_{IXPM}(kT)$ in Equation (16) are modified as:

$$\Delta_{IFWM}(kT) = \sum_{m+k \neq 0, n+k \neq 0} [A_{m+k}^H A_{n+k}^H (A_{m+n+k}^H)^* + A_{m+k}^H A_{n+k}^V (A_{m+n+k}^V)^*] C_{m,n}(lT) + m+k \neq 0, n A_{m+} kH A_n + kV A_{m+n+k} V^* C_{m,n}(lT) \quad (17a)$$

$$\phi_{IXPM}(kT) = \sum_{m+k \neq 0} (2|A_{m+k}^H|^2 + |A_{m+k}^V|^2) C_{m,0}(0) + (|A_k^H|^2 + |A_k^V|^2) C_{0,0}(0) \quad (17b)$$

The last term in the above two equations is a term of triple term product added taking the nonlinear inter-symbol crosstalk into account. Hence, in the Nyquist pulse shape, the nonlinear distortion waveform based on the additive multiplicative model is commonly described by equations (16), (17a) and (17b). When the nonlinear inter-symbol crosstalk is not taken into account, equations (17a) and (17b) are degenerated into equations (16a) and (16b).

As calculating the perturbation coefficient by using Equation (11) or (14a) is relatively complex, in a general system (a dispersion compensation or dispersion management link), introduction of the method for calculating a $C_{0,0}(0)$ term under the Gaussian pulse assumption (a single integral expression) into Equation (17b) will not bring in many errors, hence, in actual perturbation calculation, the Gaussian pulse assumption is often used for simplification of the $C_{0,0}(0)$ term.

It can be seen from the above embodiment that sampling is performed on a band-limited analog signal and the nonlinear distortion waveform is estimated by calculating the nonlinear perturbation coefficient based on the Nyquist pulse, in which not only any modulation formats are compatible, but also advantages of high precision and good adaptability may be achieved.

Embodiment 2

An embodiment of the present disclosure provides an estimation apparatus for nonlinear distortion, corresponding to the estimation method for nonlinear distortion described in Embodiment 1, with the identical contents being not going to be described any further.

Figure 6:
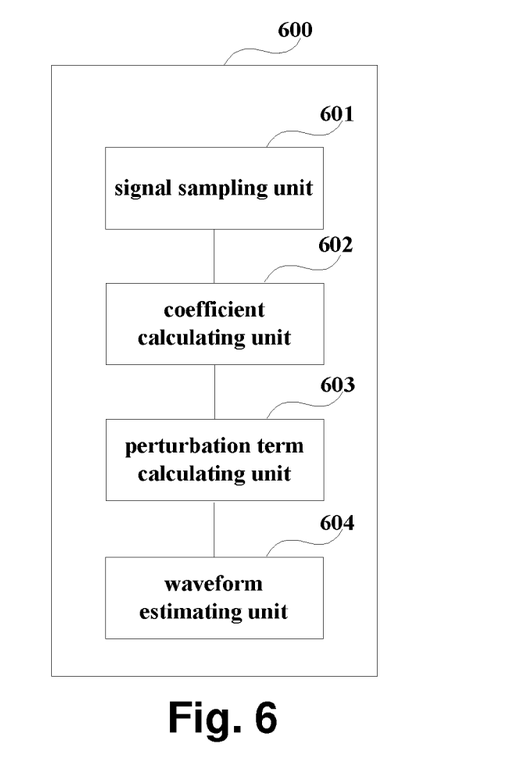
FIG. 6 is a schematic diagram of the structure of the estimation apparatus of Embodiment 2 of the present disclosure.

FIG. 6 is a schematic diagram of the structure of the estimation apparatus of the embodiment of the present disclosure. As shown in FIG. 6, the estimation apparatus 600 includes: a signal sampling unit 601, a coefficient calculating unit 602, a perturbation term calculating unit 603 and a waveform estimating unit 604.

Wherein, the signal sampling unit 601 is configured to sample a band-limited analog signal to obtain a sampling sequence; the coefficient calculating unit 602 is configured to calculate a nonlinear perturbation coefficient in nonlinear distortion estimation based on a Nyquist pulse; the perturbation term calculating unit 603 is configured to calculate a nonlinear perturbation term superimposed on a signal by using the nonlinear perturbation coefficient and the sampling sequence; and the waveform estimating unit 604 is configured to calculate a nonlinear distortion waveform by using the nonlinear perturbation term.

Figure 7:
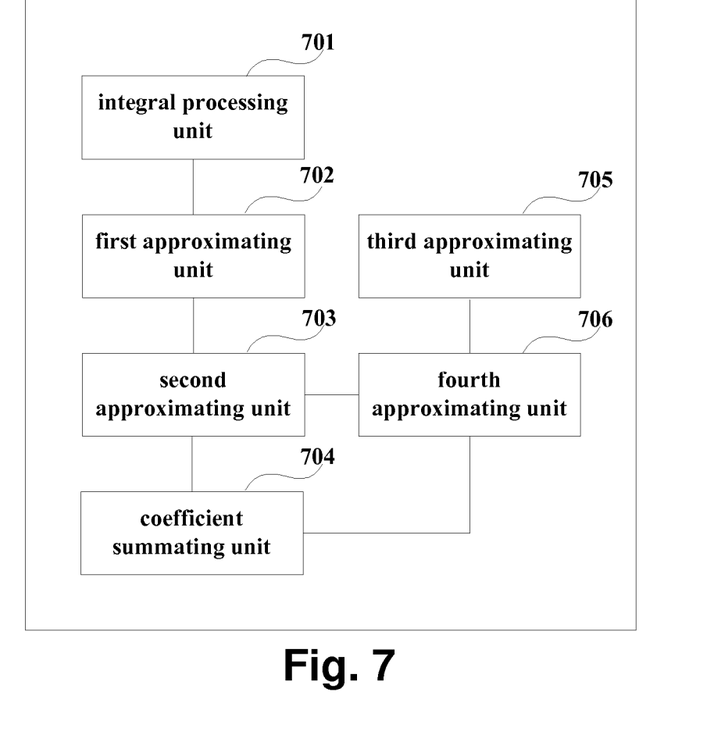
FIG. 7 is a schematic diagram of the structure of the coefficient calculating unit of Embodiment 2 of the present disclosure.

FIG. 7 is a schematic diagram of the structure of the coefficient calculating unit of the embodiment of the present disclosure. As shown in FIG. 7, the coefficient calculating unit 602 may include: an integral processing unit 701, a first approximating unit 702, a second approximating unit 703 and a coefficient summating unit 704.

Wherein, the integral processing unit 701 is configured to perform integral processing on a nonlinear perturbation coefficient of each optical fiber span based on link parameters; the first approximating unit 702 is configured to perform large dispersion approximation on the integral processed nonlinear perturbation coefficient; the second approximating unit 703 is configured to simplify the large dispersion approximated nonlinear perturbation coefficient by using the Nyquist pulse, so as to obtain a nonlinear perturbation coefficient of each optical fiber span in a form of a single integral; and the coefficient summating unit 704 is configured to sum up respectively obtained nonlinear perturbation coefficients of different optical fiber spans, so as to obtain a nonlinear perturbation coefficient of a whole transmission link in a form of a single integral.

As shown in FIG. 7, the coefficient calculating unit 602 may further include: a third approximating unit 705 and a fourth approximating unit 706. Wherein, the third approximating unit 705 is configured to perform approximation processing on link loss or a gain function in intra-channel nonlinear distortion estimation by using a rational function; and the fourth approximating unit 706 is configured to calculate the nonlinear perturbation coefficient in a form of a single integral by using the approximated link loss or gain function, or to calculate the nonlinear perturbation coefficient in a form of a single integral after ignoring the link loss or gain function, so as to obtain a nonlinear perturbation coefficient of each optical fiber span in an analytic form; and the coefficient summating unit 704 is further configured to sum up respectively obtained nonlinear perturbation coefficients of different optical fiber spans, so as to obtain a nonlinear perturbation coefficient of a whole transmission link in an analytic form.

In this embodiment, the perturbation term calculating unit 603 adds an effect of nonlinear inter-symbol interference in calculating the nonlinear perturbation term. Wherein an analytic expression of the nonlinear perturbation coefficient taking the nonlinear inter-symbol interference into account is:

$$C_{m,n}(lT) = \sum_i C^i_{m,n}(lT) = \frac{8}{9}\frac{L_{\mathit{eff}}}{L_s}$$

$$\begin{cases} \frac{1}{4\pi^2|\beta_2|lTf_s^3}\sum_i\left[e^{-\frac{j\pi t}{T}}E_i\left(-j\frac{T[mnT-\min\cdot lT]}{C(z_i)}\right)-\right.\\ \left.e^{\frac{j\pi t}{T}}E_i\left(-j\frac{T[mnT-\max\cdot lT]}{C(z_i)}\right)\right]\Big|_{z_i^0}^{L_S}, (l \neq 0) \\ j\sum_i\left[\frac{1}{2\pi|\beta_2|f_s^2}E_i\left(-j\frac{T^2mn}{C(z_i)}\right) + j\frac{\min-\max}{4\pi^2|\beta_2|f_s^4mn}e^{j\frac{mnT^2}{C(z_i)}}\right]\Big|_{z_i^0}^{L_S}, (l = 0) \end{cases}$$

where, l is an integer, T is a symbol cycle, $L_{\mathit{eff}}=1/\alpha$ is an effective transmission distance, $\alpha$ is an attenuation coefficient of an optical fiber, m, n denote that three pulse locations of a nonlinear function are t=mT, nT and (m+n)T, respectively, min and max respectively denote min(m, n, m+n) and max(m, n, m+n), $z_i$ denotes a transmission distance of a signal at an i-th span, $L_s$ is a length of an optical fiber span, $\beta_2$ is a dispersion coefficient, $\zeta$ is a residual dispersion rate, $C(z_i)=\beta_2(i-1)\zeta L_s+\beta_2 z_i$ is accumulative dispersion of the i-th span, and Ei denotes an exponential integral function.

It can be seen from the above embodiment that sampling is performed on a band-limited analog signal and the nonlinear distortion waveform is estimated by calculating the nonlinear perturbation coefficient based on the Nyquist pulse, in which not only any modulation formats are compatible, but also advantages of high precision and good adaptability may be achieved.

Embodiment 3

An embodiment of the present disclosure provides a receiver, including the estimation apparatus 600 for nonlinear distortion described in Embodiment 2.

Figure 8:
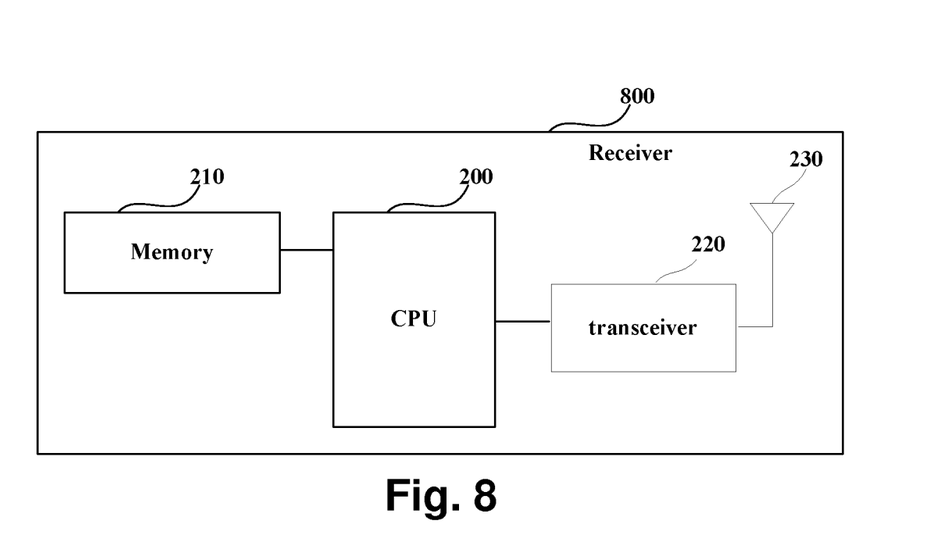
FIG. 8 is a schematic diagram of the receiver of Embodiment 3 of the present disclosure.

FIG. 8 is a schematic diagram of the receiver of the embodiment of the present disclosure. The receiver 800 may include a central processing unit (CPU) 200 and a memory 210, the memory 210 being coupled to the central processing unit 200. Wherein, the memory 210 may store various data;

furthermore, it stores programs for information processing, and executes the programs under the control of the central processing unit 200.

In an implementation, functions of the estimation apparatus 600 may be integrated into the central processing unit 200. Wherein, the central processing unit 200 may be configured to carry out the estimation method described in Embodiment 1.

In another implementation, the estimation apparatus 600 and the central processing unit 200 may be configured separately. For example, the estimation apparatus 600 may be configured as a chip connected to the central processing unit 200, with the functions of the estimation apparatus 600 being realized under control of the central processing unit 200.

Furthermore, as shown in FIG. 8, the receiver 800 may include a transceiver 220, and an antenna 230, etc. Wherein, the functions of the above components are similar to those of the prior art, and shall not be described herein any further.

It should be noted that the receiver 800 does not necessarily include all the components shown in FIG. 8; furthermore, the receiver 800 may include components not shown in FIG. 8, and the prior art may be referred to for details.

An embodiment of the present disclosure further provides a computer-readable program, wherein when the program is executed in an electronic device, the program enables a computer to carry out the estimation method for nonlinear distortion as described in Embodiment 1 in the electronic device.

An embodiment of the present disclosure further provides a storage medium in which a computer-readable program is stored, wherein the computer-readable program enables a computer to carry out the estimation method for nonlinear distortion as described in Embodiment 1 in an electronic device.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

The invention claimed is:

1. An estimation apparatus for nonlinear distortion, configured in a receiving device of a communication system, the estimation apparatus comprising:
   a digital signal processor,
   the digital signal processor is configured to;
   sample a band-limited analog signal to obtain a sampling sequence;
   calculate a nonlinear perturbation coefficient in a nonlinear distortion estimation based on a Nyquist pulse;
   calculate a nonlinear perturbation term superimposed on a signal by using the nonlinear perturbation coefficient and the sampling sequence; and
   calculate a nonlinear distortion waveform by using the nonlinear perturbation term;
   wherein the processor is further configured to;
   perform integral processing on a nonlinear perturbation coefficient of each optical fiber span based on link parameters;
   perform large dispersion approximation on the integral processed nonlinear perturbation coefficient;
   simplify the large dispersion approximated nonlinear perturbation coefficient by using the Nyquist pulse, so as to obtain a nonlinear perturbation coefficient of each optical fiber span in a form of a single integral; and
   sum up respectively obtained nonlinear perturbation coefficients of different optical fiber spans, so as to obtain a nonlinear perturbation coefficient of a whole transmission link in a form of a single integral.

2. The estimation apparatus according to claim 1, wherein the processor is further configured to:
   perform approximation processing on one of a link loss and a gain function in an intra-channel nonlinear distortion estimation by using a rational function; and
   calculate the nonlinear perturbation coefficient in the form of the single integral by using the one of the link loss and gain function and calculate the nonlinear perturbation coefficient in the form of the single integral after ignoring the one of the ink loss and gain function to obtain the nonlinear perturbation coefficient of each optical fiber span in an analytic form, and
   sum up respectively the obtained nonlinear perturbation coefficients of different optical fiber spans to obtain the link nonlinear perturbation coefficient of a transmission link in the analytic form.

3. The estimation apparatus according to claim 1, wherein the processor is further configured to add an effect of nonlinear inter-symbol interference in calculating the nonlinear perturbation term.

4. The estimation apparatus according to claim 3, wherein an analytic expression of the nonlinear perturbation coefficient taking the nonlinear inter-symbol interference into account is:

$$C_{m,n}(lT) = \sum_i C^i_{m,n}(lT) = \frac{8}{9}\frac{L_{eff}}{L_s}$$

$$\begin{cases} \frac{1}{4\pi^2|\beta_2|lTf_s^3}\sum_i\left[e^{-\frac{j\pi t}{T}}E_i\left(-j\frac{T[mnT-\min\cdot lT]}{C(z_i)}\right) - \right. \\ \left. e^{\frac{j\pi t}{T}}E_i\left(-j\frac{T[mnT-\max\cdot lT]}{C(z_i)}\right)\right]\Big|_{z_i^0}^{L_s}, (l \neq 0) \\ j\sum_i\left[\frac{1}{2\pi|\beta_2|f_s^2}E_i\left(-j\frac{T^2mn}{C(z_i)}\right) + j\frac{\min-\max}{4\pi^2|\beta_2|f_s^4 mn}e^{j\frac{mnT^2}{C(z_i)}}\right]\Big|_{z_i^0}^{L_s}, (l = 0) \end{cases}$$

where I is an integer, T is a symbol cycle, $L_{eff}=1/\alpha$ is an effective transmission distance, $\alpha$ is an attenuation coefficient of an optical fiber, m,n denote that three pulse locations of a nonlinear function are t=mT, nT and (m+n)T, respectively, min and max respectively denote min(m,n,m+n) and max(m,n,m+n), $z_i$ denotes a transmission distance of a signal at an i-th span, $L_s$ is a length of an optical fiber span, $\beta_2$ is a dispersion coefficient, $\zeta$ is a residual dispersion rate, $C(z_i)=\beta_2(i-1)\zeta L_s+\beta_2 z_i$ is accumulative dispersion of the i-th span, and Ei denotes an exponential integral function.

5. A receiver, comprising the estimation apparatus for nonlinear distortion as claimed in claim 1.

6. An estimation method for nonlinear distortion, comprising the following steps performed by a receiving device of a communication system:
- sampling a band-limited analog signal to obtain a sampling sequence;
- calculating a nonlinear perturbation coefficient in a nonlinear distortion estimation based on a Nyquist pulse;
- calculating a nonlinear perturbation term superimposed on a signal by using the nonlinear perturbation coefficient and the sampling sequence; and
- calculating a nonlinear distortion waveform by using the nonlinear perturbation term;
- wherein the calculating a nonlinear perturbation coefficient in nonlinear distortion estimation based on a Nyquist pulse comprises the following steps performed by the receiving device;
- performing integral processing on a nonlinear perturbation coefficient of each optical fiber span based on link parameters;
- performing large dispersion approximation on the integral processed nonlinear perturbation coefficient;
- simplifying the large dispersion approximated nonlinear perturbation coefficient by using the Nyquist pulse, so as to obtain a nonlinear perturbation coefficient of each optical fiber span in a form of a single integral; and
- summing up respectively obtained nonlinear perturbation coefficients of different optical fiber spans, so as to obtain a nonlinear perturbation coefficient of a whole transmission link in a form of a single integral.

7. The method according to claim 6, wherein the calculating the nonlinear perturbation coefficient in the nonlinear distortion estimation based on the Nyquist pulse further comprises the following steps performed by the receiving device:
- performing approximation processing on one of link loss and a gain function in an intra-channel nonlinear distortion estimation by using a rational function; and
- one of calculating the nonlinear perturbation coefficient in the form of the single integral by using one of the link loss and gain function, and calculating the nonlinear perturbation coefficient in the form of the single integral after ignoring the one of the link loss and gain function to obtain the nonlinear perturbation coefficient of each optical fiber span in an analytic form, and
- summing up the respectively obtained nonlinear perturbation coefficients of different optical fiber spans to obtain the link nonlinear perturbation coefficient of a transmission link in the analytic form.

8. The method according to claim 6, wherein the method further comprises the following steps performed by the receiving device: adding an effect of nonlinear inter-symbol interference in calculating the nonlinear perturbation term.

* * * * *